(12) United States Patent
Park

(10) Patent No.: US 11,942,881 B2
(45) Date of Patent: Mar. 26, 2024

(54) MOTOR PARAMETER MEASURING DEVICE AND METHOD

(71) Applicant: HL MANDO CORPORATION, Pyeongtaek-si (KR)

(72) Inventor: Jae Sang Park, Yongin-si (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 17/831,161

(22) Filed: Jun. 2, 2022

(65) Prior Publication Data

US 2022/0393628 A1 Dec. 8, 2022

(30) Foreign Application Priority Data

Jun. 8, 2021 (KR) .................. 10-2021-0074007

(51) Int. Cl.
*H02P 21/22* (2016.01)
*H02P 21/14* (2016.01)
*H02P 27/06* (2006.01)

(52) U.S. Cl.
CPC .............. *H02P 21/22* (2016.02); *H02P 21/14* (2013.01); *H02P 27/06* (2013.01); *H02P 2207/05* (2013.01)

(58) Field of Classification Search
CPC .......... H02P 21/22; H02P 21/14; H02P 27/06; H02P 2207/05
See application file for complete search history.

(56) References Cited

U.S. PATENT DOCUMENTS

| | | | |
|---|---|---|---|
| 2008/0228416 A1* | 9/2008 | Arnet | H02P 21/16 702/65 |
| 2014/0062368 A1* | 3/2014 | Roessler | B60L 50/51 363/55 |
| 2019/0252970 A1* | 8/2019 | Ohdaira | H02P 27/08 |

FOREIGN PATENT DOCUMENTS

| | | | | |
|---|---|---|---|---|
| CN | 110391754 A | * | 10/2019 | .......... G01R 19/165 |
| JP | 2006280141 A | * | 10/2006 | |
| JP | 2008220155 A | * | 9/2008 | ............. B62D 5/046 |
| WO | WO-2006033181 A1 | * | 3/2006 | ............. H02P 21/12 |
| WO | WO-2014084009 A1 | * | 6/2014 | ............. H02P 21/16 |

* cited by examiner

*Primary Examiner* — Bickey Dhakal
(74) *Attorney, Agent, or Firm* — Ladas & Parry, LLP

(57) ABSTRACT

The disclosure relates to a motor parameter measuring device and method. According to the disclosure, a motor parameter measuring device comprises a torque receiver receiving a motor torque of a motor rotated by an external force, a motor constant calculator calculating a motor constant based on the motor torque, and a parameter calculator controlling an inverter connected with the motor to form a closed circuit and calculating a parameter of the motor based on a current generated by the rotating motor in the closed circuit.

8 Claims, 7 Drawing Sheets

MOTOR PARAMETER MEASURING DEVICE AND METHOD

CROSS-REFERENCE TO RELATED APPLICATION

This application claims priority from Korean Patent Application No. 10-2021-0074007, filed on Jun. 8, 2021, which is hereby incorporated by reference for all purposes as if fully set forth herein.

BACKGROUND

Field

The present embodiments relate to a motor parameter measuring device and method for measuring a parameter of a motor.

Description of Related Art

A motor is a machine that obtains rotational force from electrical energy and may include a stator and a rotor. The rotor may be configured to electromagnetically interact with the stator and be rotated by the force acting between the magnetic field and the current flowing in the coil.

The motor is driven by receiving the driving power generated through an inverter. To generate driving power, a velocity controller generates a current command, a current controller generates a voltage command, and the inverter receives the generated commands. The velocity controller and the current controller include a proportional integral derivative (PID) controller, and the gain of the PID controller is determined by parameters. Thus, the parameters should be determined to supply the driving power of the motor. The parameters may include constants or variables that vary depending on each context. For example, variable parameters may include phase resistance, counter-electromotive force constant, d-axis inductance, and q-axis inductance.

BRIEF SUMMARY

In the foregoing background, the disclosure provides a motor parameter measuring device and method that forms a closed circuit, rotates a motor, and measures the parameters of the motor.

To achieve the foregoing objectives, in an aspect, the disclosure provides a motor parameter measuring device comprising a torque receiver receiving a motor torque of a motor rotated by an external force, a motor constant calculator calculating a motor constant based on the motor torque, and a parameter calculator controlling an inverter connected with the motor to form a closed circuit and calculating a parameter of the motor based on a current generated by the rotating motor in the closed circuit.

In another aspect, the disclosure provides a motor parameter measuring method comprising a torque reception step receiving a motor torque of a motor rotated by an external force, a motor constant calculation step calculating a motor constant based on the motor torque, and a parameter calculation step controlling an inverter connected with the motor to form a closed circuit and calculating a parameter of the motor based on a current generated by the rotating motor in the closed circuit.

According to the disclosure, the motor parameter measuring device and method may measure motor parameters simply and quickly by using a controller used for driving the motor in the same facility while measuring basic motor characteristics.

DESCRIPTION OF DRAWINGS

The above and other objects, features, and advantages of the present disclosure will be more clearly understood from the following detailed description, taken in conjunction with the accompanying drawings, in which.

DETAILED DESCRIPTION

Figure 1:
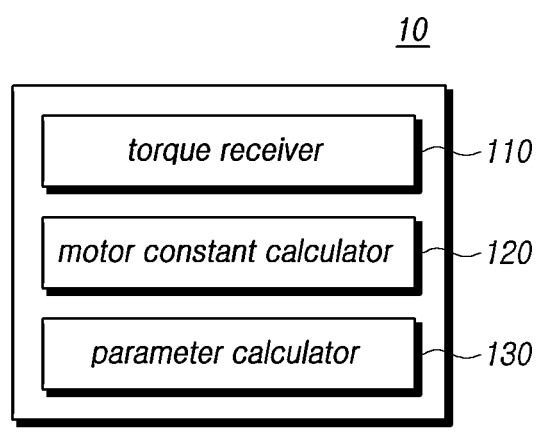
FIG. 1 is a block diagram illustrating a motor parameter measuring device according to the disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

A motor parameter measuring device 10 is described below with reference to the accompanying drawings, according to an embodiment of the disclosure.

FIG. 1 is a block diagram illustrating a motor parameter measuring device 10 according to the disclosure.

According to the disclosure, the motor parameter measuring device 10 may include a torque receiver 110, a motor constant calculator 120, and a parameter calculator 130.

The torque receiver 110 may receive the motor torque of the motor 20 rotated by external force.

The motor 20 is a machine that obtains rotational force from electrical energy and may include a stator and a rotor. The motor 20 in the disclosure is described as, e.g., a permanent magnet synchronous motor (PMSM) but is not limited thereto.

The torque receiver 110 may receive the torque of the motor 20, measured by a motor performance tester, such as a torque meter or a servo motor, or may include a motor performance tester to directly measure the motor torque. The motor performance tester may rotate the motor 20 at a constant velocity or measure the torque of the motor 20.

The motor constant calculator 120 may calculate the motor constant based on the motor torque.

Specifically, the motor constant calculator 120 may calculate the motor constant Ke based on the motor torque T based on Equation 1 below.

$$T = \frac{3}{2}\left(Ke + \frac{P}{2}(I_q - I_d)I_d\right)I_q \quad \text{[Equation 1]}$$
$$T = \frac{3}{2} Ke\, I_q$$
$$Ke = T\frac{2}{3I_q}$$

In an embodiment, the motor constant calculator 120 may flow the synchronous coordinate system q-axis current while gradually increasing the q-axis current. For example, if the maximum allowable current of the motor 20 is 100 A, the motor constant calculator 120 may increase the current from 10 A gradually by 10 A and flow the current, calculating the motor constant at each point.

In this case, the motor constant may be calculated, with the synchronous coordinate system d-axis current fixed to 0.

As described above, the output of the motor 20 decreases as the current increases and, based thereupon, the motor parameter measuring device 10 may more accurately calculate the motor constant. It is also possible to derive the motor constant Ke without a separate additional device in a combination with a controller, e.g., an electronic control unit (ECU) and to identify the trend of changes in motor constant according to the current.

Figure 2:
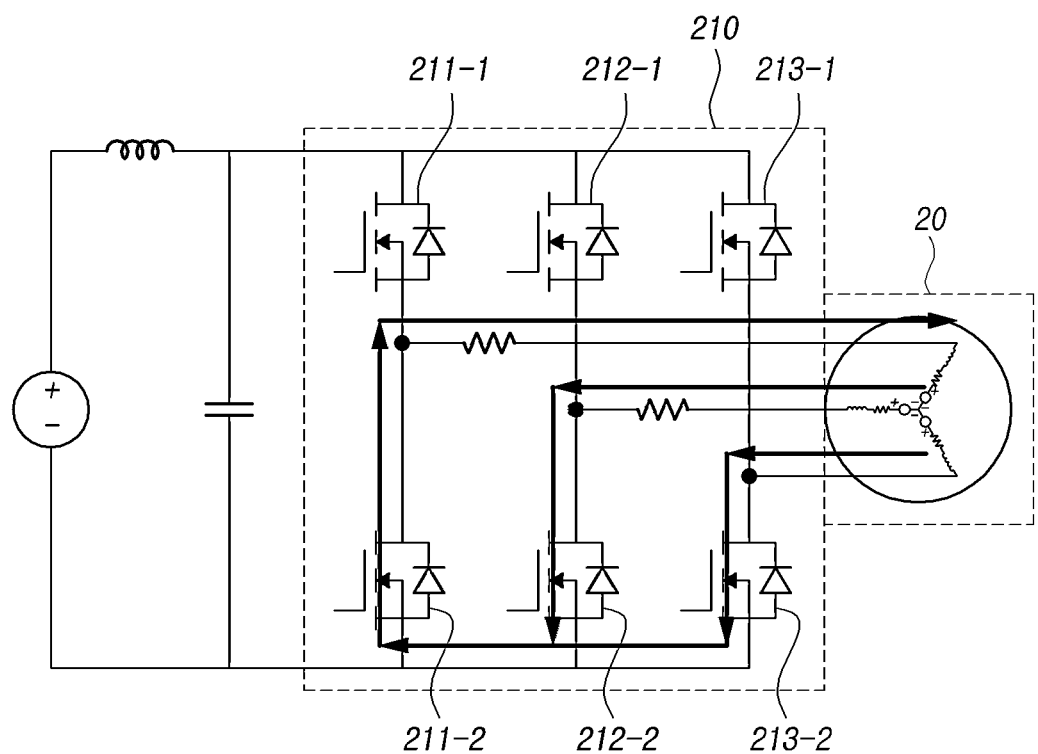
FIG. 2 is a view illustrating calculation of a motor parameter by forming a closed circuit according to an embodiment.

FIG. 2 is a view illustrating calculation of a parameter of a motor 20 by forming a closed circuit according to an embodiment.

Referring to FIG. 2, the parameter calculator 130 may control the inverter 210 connected with the motor 20 to form a closed circuit and calculate the parameter of the motor 20 based on the current generated by the rotating motor 20 in the closed circuit.

Specifically, the parameter calculator 130 may calculate the parameter of the motor 20 based on Equation 2 below.

$$\begin{bmatrix} v_d \\ v_q \end{bmatrix} = \begin{bmatrix} R_a + \frac{d}{dt}L_d & -\omega Lq \\ \omega Lq & R_a + \frac{d}{dt}L_d \end{bmatrix} \begin{bmatrix} i_d \\ i_q \end{bmatrix} + \begin{bmatrix} 0 \\ \omega \Psi_a \end{bmatrix} \quad \text{[Equation 2]}$$

The parameter calculator 130 may apply the synchronous coordinate system d-axis voltage and q-axis voltage each of which is 0, calculating the parameter of the motor 20. The parameters of the motor 20 may include, e.g., resistance R, synchronous coordinate system d-axis inductance $L_d$, and q-axis inductance $L_q$.

The parameter may be calculated based on Equation 3 below.

$$R = \frac{2}{3}\frac{TW}{I_{peak}^2} \quad \text{[Equation 3]}$$
$$L_d = -\frac{(RI_q + W_m Ke)}{W_m \frac{P}{2} I_d}$$
$$L_q = -\frac{RI_q}{I_q W_m \frac{P}{2}}$$

In the inverter 210, the first high-side switching element 211-1 has a complementary relationship with the first low-side switching element 211-2. Thus, the inverter 210 may control the first high-side switching element 211-1 to be open and control the second high-side switching element 212-1 and third high-side switching element 213-1, which are connected in parallel with the first high-side switching element 211-1 and have the same structure, to be open. As a result, the first low-side switching element 211-2, the second low-side switching element 212-2, and the third low-side switching element 213-2 may be shorted, forming a closed circuit connected with the three phases of the motor 20 as shown in FIG. 2.

Conventional motor parameter measurement methods have several factors that may cause an error in calculating motor parameters. For example, the conventional methods perform measurement using additional devices and different methods and thus cause an error between the devices, influencing the accuracy of the motor parameter. Accordingly, the accuracy of resistance or inductance which is a small value may be degraded.

In contrast, as described above, the motor parameter measuring device 10 may measure motor parameters simply and quickly by using a controller used for driving the motor 20 in the same facility while measuring the basic parameters of the motor 20.

Figure 3:
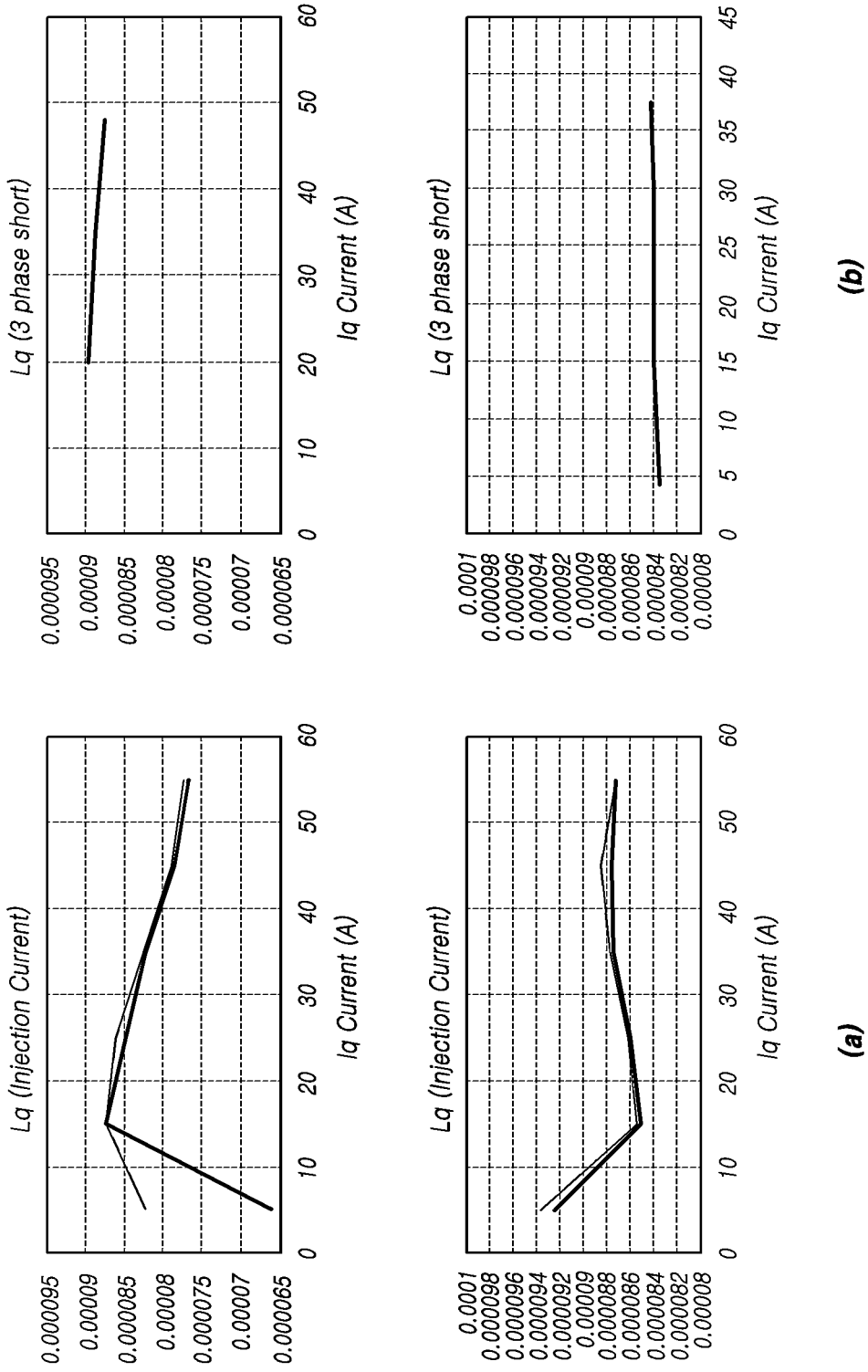
FIG. 3 is a view illustrating a result of measuring a motor parameter according to an embodiment.

FIG. 3 is a view illustrating a result of measuring a motor parameter according to an embodiment.

Referring to FIG. 3, a of FIG. 3 shows a result of measuring the motor 20 by a conventional motor parameter measurement method, and b of FIG. 3 shows a result of measuring the motor 20 according to the disclosure.

The result of the conventional motor parameter measurement exhibits a larger measurement error than the result of measuring the motor 20 according to the disclosure. In other words, the result obtained by the conventional motor parameter measurement method has a larger variation than the result of measuring the parameter of the motor according to the disclosure.

As described above, the disclosure may calculate a variation in inductance according to the current since the current is changed depending on the rotation velocity. Further, individual measurements may derive independent results and may calculate all of the parameter values of the motor 20, such as the resistance of the measurement circuit, synchronous coordinate system d-axis inductance, and q-axis inductance.

Figure 4:
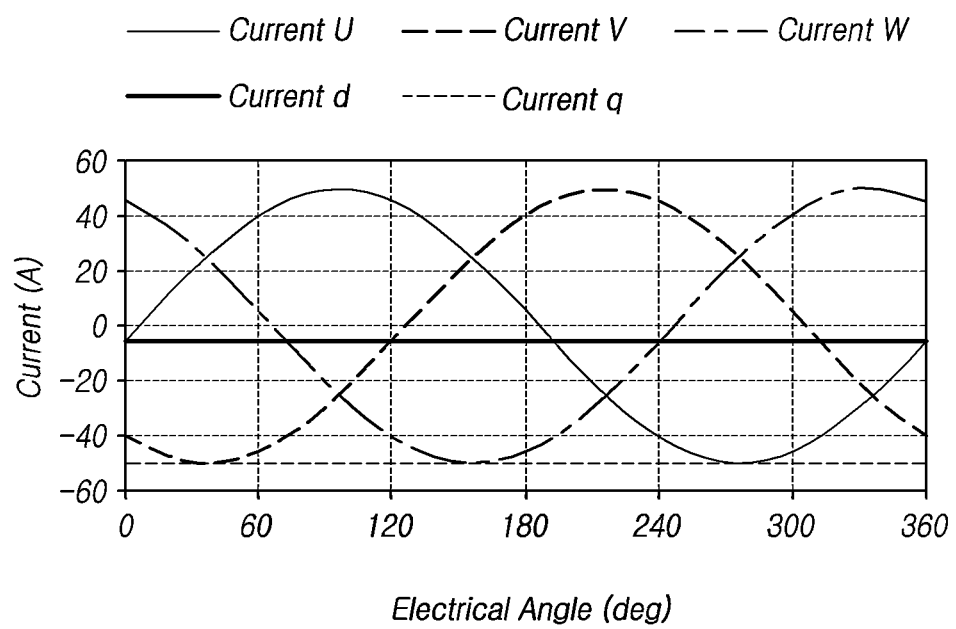
FIGS. 4, 5, and 6 are views illustrating detection of an error in a current sensor according to a measured current of a motor according to an embodiment.
Figure 5:
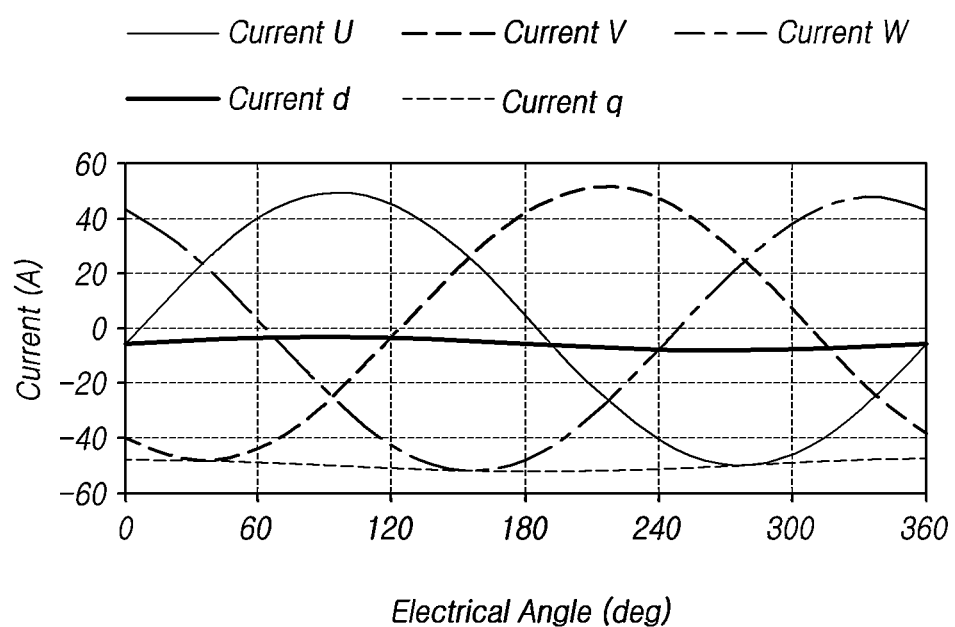
Figure 6:
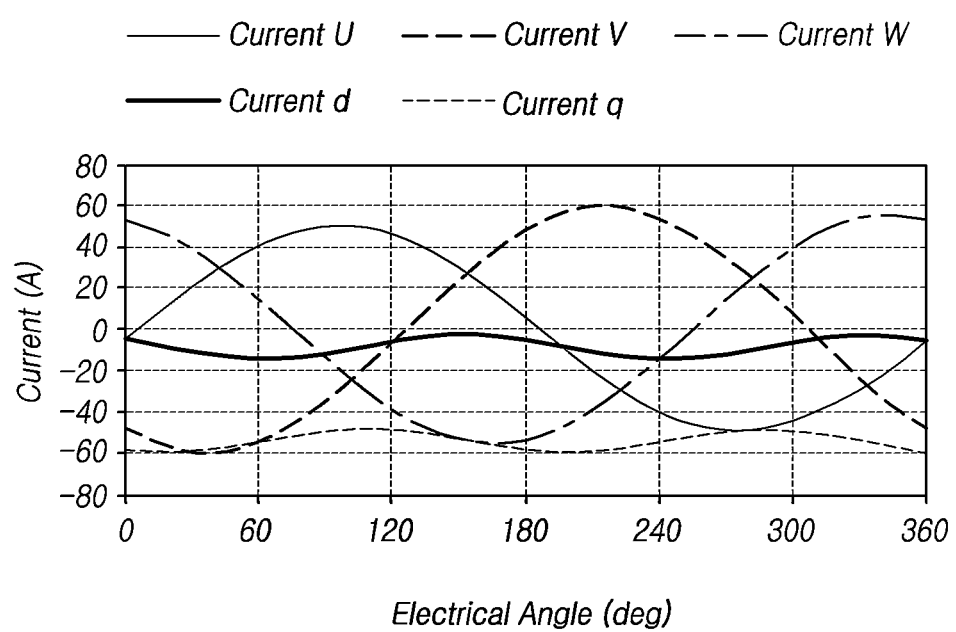

FIGS. 4, 5, and 6 are views illustrating detection of an error in a current sensor according to a measured current of a motor 20 according to an embodiment.

The parameter calculator 130 may detect an error in the current sensor based on whether the synchronous coordinate system d-axis current or q-axis current ripples.

FIG. 4 is a view illustrating the current value measured when the current sensor of FIG. 4 is in a normal state. Specifically, if the motor 20 is shorted and rotated at a specific velocity, the output voltage may be fixed to 0. In this case, if the current flowed through the motor 20 by the counter-electromotive force is measured, the synchronous coordinate system d-axis current and q-axis current in the normal state of the current sensor may be measured within a predetermined current range.

However, if ripples occur in the measured synchronous coordinate system d-axis current and q-axis current as shown in FIGS. 5 and 6, the parameter calculator 130 may determine that an error has occurred in the current sensor.

Whether the error comes from an offset or gain may be determined according to the order of the ripples caused in the measured synchronous coordinate system d-axis current and q-axis current.

Referring to FIG. 5, it may be identified that the first-order ripple occurs in the measured synchronous coordinate system d-axis current and q-axis current and, if the first-order ripple occurs in the measured synchronous coordinate system d-axis current and q-axis current, the parameter calculator 130 may determine that an offset error has occurred in the current sensor.

Referring to FIG. 6, it may be identified that the second-order ripple occurs in the measured synchronous coordinate system d-axis current and q-axis current and, if the second-order ripple occurs in the measured synchronous coordinate system d-axis current and q-axis current, the parameter calculator 130 may determine that a gain error has occurred in the current sensor.

In an embodiment, the measured synchronous coordinate system d-axis current and q-axis current where the first-order ripple and the second-order ripple have occurred may have the same order.

Described below is a method for measuring the parameters of the motor 20 using the motor parameter measuring device 10 capable of performing the above-described operations.

Figure 7:
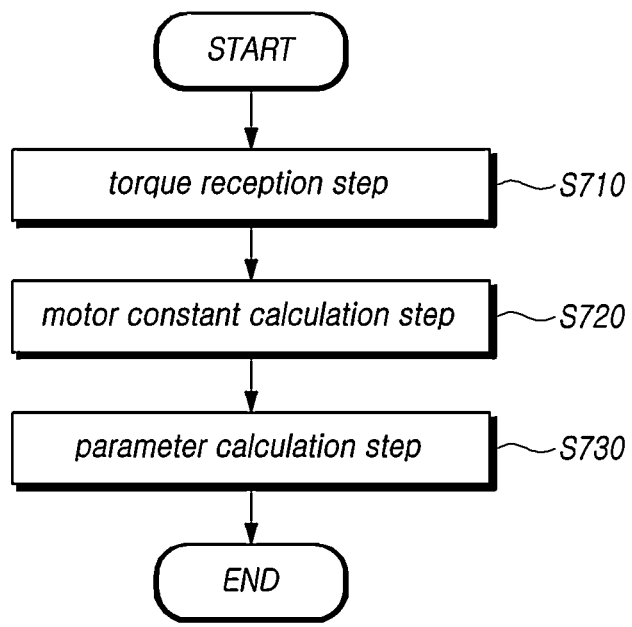
FIG. 7 is a flowchart illustrating a motor parameter measurement method according to the disclosure.

FIG. 7 is a flowchart illustrating a motor 20 parameter measurement method according to the disclosure.

Referring to FIG. 7, according to the disclosure, a motor parameter measuring method may comprise a torque reception step S710 receiving a motor torque of a motor 20 rotated by an external force, a motor constant calculation step S720 calculating a motor constant based on the motor torque, and a parameter calculation step S730 controlling an inverter 210 connected with the motor 20 to form a closed circuit and calculating a parameter of the motor 20 based on a current generated by the rotating motor in the closed circuit.

The motor constant calculation step S720 may flow the synchronous coordinate system q-axis current while gradually increasing the q-axis current and may calculate the motor constant whenever the current increases. In other words, the motor parameter measuring device 10 may calculate the motor constant according to the current.

The motor constant calculation step S720 may calculate the motor constant with the synchronous coordinate system d-axis current fixed to 0.

The parameter calculation step S730 may calculate the parameter by applying the synchronous coordinate system q-axis voltage and d-axis voltage of 0.

The parameter calculation step S730 may detect an error in the current sensor based on whether the synchronous coordinate system d-axis current or q-axis current ripples.

The parameter calculation step S730 may control the high-side switching element or low-side switching element for each phase of the inverter to simultaneously turn on, forming a closed circuit.

As described above, according to the disclosure, the motor parameter measuring device and method may measure motor parameters simply and quickly by using a controller used for driving the motor in the same facility while measuring basic motor characteristics.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A motor parameter measuring device, comprising:
   a torque receiver receiving a motor torque of a motor rotated by an external force;
   a motor constant calculator calculating a motor constant based on the motor torque; and
   a parameter calculator controlling an inverter connected with the motor to form a closed circuit, in which multiple phases of the motor are connected to each other, by simultaneously turning on a high-side switching element or a low-side switching element for each phase of the inverter, and calculating a parameter of the motor based on a current generated by the rotating motor in the closed circuit, in which the multiple phases of the motor are connected to each other,
   wherein the motor constant calculator calculates the motor constant with a synchronous coordinate system d-axis current fixed to 0.

2. The motor parameter measuring device of claim 1, wherein the motor constant calculator flows a synchronous coordinate system q-axis current while gradually increasing the q-axis current.

3. The motor parameter measuring device of claim 1, wherein the parameter calculator calculates the parameter by applying a synchronous coordinate system q-axis voltage and d-axis voltage of 0.

4. The motor parameter measuring device of claim 1, wherein the parameter calculator detects an error in a current sensor based on whether a synchronous coordinate system d-axis current or q-axis current ripples.

5. A motor parameter measuring method, comprising:
receiving a motor torque of a motor rotated by an external force;
calculating a motor constant based on the motor torque; and
controlling an inverter connected with the motor to form a closed circuit, in which multiple phases of the motor are connected to each other, by simultaneously turning on a high-side switching element or a low-side switching element for each phase of the inverter, and calculating a parameter of the motor based on a current generated by the rotating motor in the closed circuit, in which the multiple phases of the motor are connected to each other,
wherein the calculating of the motor constant comprises calculating the motor constant with a synchronous coordinate system d-axis current fixed to 0.

6. The motor parameter measuring method of claim 5, wherein the calculating of the motor constant comprises flowing a synchronous coordinate system q-axis current while gradually increasing the q-axis current.

7. The motor parameter measuring method of claim 5, wherein the calculating of the parameter of the motor comprises calculating the parameter by applying a synchronous coordinate system q-axis voltage and d-axis voltage of 0.

8. The motor parameter measuring method of claim 5, wherein the calculating of the parameter of the motor comprises detecting an error in a current sensor based on whether a synchronous coordinate system d-axis current or q-axis current ripples.

\* \* \* \* \*